March 24, 1925.

F. C. BRUNS

EDUCATIONAL APPARATUS

Filed April 21, 1924

1,531,070

WITNESSES

INVENTOR
F. C. Bruns.
BY
ATTORNEYS

Patented Mar. 24, 1925.

1,531,070

UNITED STATES PATENT OFFICE.

FREDERICK C. BRUNS, OF RICHMOND HILL, NEW YORK.

EDUCATIONAL APPARATUS.

Application filed April 21, 1924. Serial No. 708,034.

*To all whom it may concern:*

Be it known that I, FREDERICK C. BRUNS, a citizen of the United States, and a resident of the city of New York, Richmond Hill, borough of Queens, in the county of Queens and State of New York, have invented a new and Improved Educational Apparatus, of which the following is a full, clear, and exact description.

This invention relates to educational apparatus and more particularly to an apparatus embodying a plate together with a plurality of pieces, the pieces being magnetized, so that there is an attraction between the pieces and the plate whereby the pieces will adhere to the plate when placed thereon to enable the formation on the plate of figures, characters or designs.

An object of my invention is to provide an educational apparatus of the character stated, which can be manufactured and sold at a reasonably low price, which will be instructive and entertaining, and which will lend itself to artistic development of the user.

With these and other objects in view, the invention consists in certain novel features of construction and combinations and arrangements of parts which will be more fully hereinafter described and pointed out in the claim.

In the accompanying drawings—

1 represents a plate which is preferably of steel although it may be made of any other suitable material. I have illustrated this plate 1 as having a border 2 and provided at its rear with a support 3 hingedly connected to the plate as shown at 4, so that the plate and support constitute an easel.

It is obvious that the invention is not limited to the particular construction and arrangement of the plate and its mounting, as this may be varied in many ways without departing from my invention.

In connection with the plate 1 I employ a plurality of pieces 5. These pieces 5 may be of various sizes, shapes and colors and are preferably magnetized so that when they are placed on or adjacent the plate 1 they will be attracted to the plate and will adhere thereto by their magnetism so as to remain in the position in which they are located.

Figure 1:
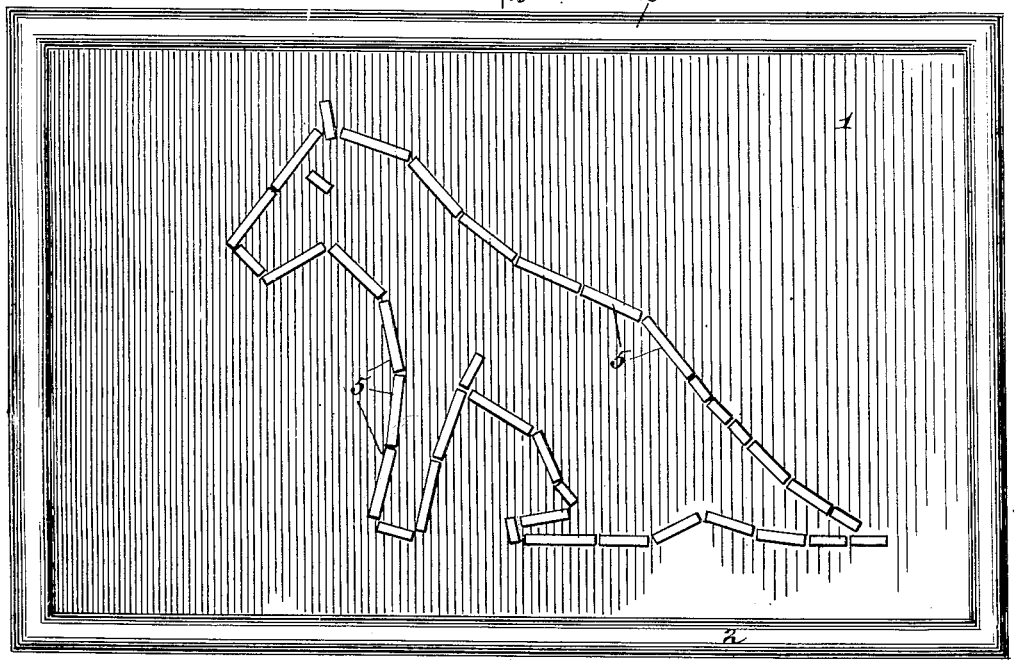
Figure 1 is a view in front elevation illustrating my improved apparatus.
Figure 2:
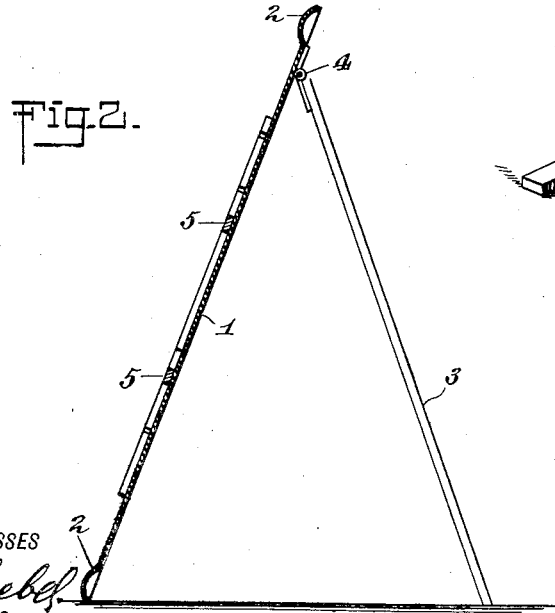
Figure 2 is a view in transverse section on the line 2—2 of Figure 1.
Figure 3:
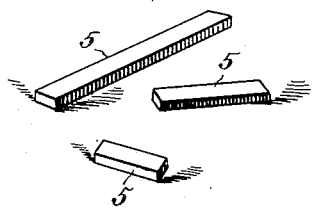
Figure 3 illustrates in perspective the number of pieces of varying sizes which may be employed with my improved apparatus.

As seen in Figure 1 these pieces 5 may be arranged so as to form a figure. It is obvious that they may be arranged to form letters, designs, figures or any other illustrations, thus giving to the user a wide latitude in the placing of the pieces both for instruction and entertainment.

I claim:

An educational apparatus, comprising a sheet metal plate constituting a field, and a plurality of independently magnetized pieces of various shapes and sizes and having a color differing from the color of the plate, and adapted to be arranged on the plate to form a character, figure, design and the like and maintained in position by the magnetism of the pieces.

FREDERICK C. BRUNS.